(12) United States Patent
Watanabe (10) Patent No.: US 9,389,689 B2
(45) Date of Patent: Jul. 12, 2016

(54) TOUCH SCREEN DEVICE (71) Applicant: Alpine Electronics, Inc., Tokyo (JP)

(72) Inventor: Koji Watanabe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 138 days.

(21) Appl. No.: 14/105,903

(22) Filed: Dec. 13, 2013

(65) Prior Publication Data

US 2014/0184946 A1  Jul. 3, 2014

(30) Foreign Application Priority Data

Dec. 27, 2012 (JP) ................................ 2012-285844

(51) Int. Cl.
  *G06F 3/041* (2006.01)
  *G06F 3/01* (2006.01)
  *B60K 35/00* (2006.01)
  *B60K 37/06* (2006.01)

(52) U.S. Cl.
  CPC ................ *G06F 3/016* (2013.01); *B60K 35/00* (2013.01); *B60K 37/06* (2013.01); *G06F 3/041* (2013.01); *B60K 2350/1028* (2013.01)

(58) Field of Classification Search
  USPC .......................... 345/173; 178/18.01; 349/12
  See application file for complete search history.

(56) References Cited

U.S. PATENT DOCUMENTS

| 2011/0102342 A1* | 5/2011 | Iwawaki et al. ............... 345/173 |
| 2012/0162143 A1* | 6/2012 | Kai et al. ....................... 345/177 |
| 2012/0193933 A1* | 8/2012 | Spitler ................... B62D 25/14 296/74 |
| 2013/0188299 A1* | 7/2013 | Kuo .......................... 361/679.01 |

\* cited by examiner

*Primary Examiner* — Jason Olson
*Assistant Examiner* — Sosina Abebe
(74) *Attorney, Agent, or Firm* — Brinks Gilson & Lione (57) ABSTRACT

In a touch screen device, a second space is secured between a peripheral edge of an opening of an exterior case and a panel surface of a touch panel; an elastic body is provided on the back surface of an easily deformable portion extending along the peripheral edge of the opening; and a third space that is narrower than the second space is secured between the elastic body and the panel surface of the touch panel. When the easily deformable portion is pressed and bent by the input operation, the elastic body is brought into contact with the panel surface and displaces the touch panel backward so that the vibrating touch panel does not come into direct contact with the peripheral edge of the opening.

15 Claims, 7 Drawing Sheets

TOUCH SCREEN DEVICE

RELATED APPLICATIONS

The present application claims priority to Japanese Patent Application Serial Number 2012-285844, filed Dec. 27, 2012, the entirety of which is hereby incorporated by reference.

BACKGROUND OF THE INVENTION

1. Field of the Invention

The present disclosure relates to a touch screen device in which to perform an input operation, a fingertip or the like of the user is pressed against the surface of a touch panel. More specifically, the present disclosure relates to a touch screen device that can provide tactile feedback to a user by vibrating a touch panel at the time of an input operation.

2. Description of the Related Art

When a touch screen device having a feedback mechanism that vibrates a touch panel at the time of input operation detects that a fingertip or the like of the user is pressed against any location or predetermined region on a panel surface (input operation surface) of the touch panel, a vibrating element such as a piezoelectric actuator is activated and vibrates the touch panel in a direction perpendicular to the panel surface. For example, when a fingertip or the like of the user is pressed against the panel surface of the touch panel, the device detects this and vibrates the touch panel. The user can learn from the vibration transmitted to the fingertip or the like that input operation is being surely performed.

Previously, there has been known a touch screen device that is made by providing vibrating elements on the outer edge of a rectangular touch panel, laminating and integrating this touch panel with a display panel with cushion members therebetween, and exposing a panel surface of the touch panel from an opening of an exterior case that houses this laminated body (see, for example, Japanese Unexamined Patent Application Publication No. 2006-227712). In the case of a touch screen device having such a configuration, the user can see an image on the display panel through the touch panel exposed in the opening. When the user presses their fingertip or the like against the panel surface of the touch panel, the touch panel detects the coordinate position of the fingertip or the like, and the vibrating elements are activated and minutely vibrates the touch panel in the thickness direction.

At that time, if the peripheral edge of the opening provided in the exterior case is in contact with or close to the panel surface of the touch panel, a vibrating noise is generated from the exterior case owing to the vibration of the touch panel. To address this, a space having predetermined dimensions is secured between the peripheral edge of the opening and the panel surface of the touch panel. The larger this space, the more effective it is to prevent vibration noise. However, a large space impairs the aesthetic appearance and makes it difficult to prevent the entry of a foreign substance. So, the space is minimized, and the dimensional accuracy and assembly accuracy of related components are controlled with a high degree of accuracy so that vibration noise is not generated.

If a through-hole for disposing operation buttons or the like is provided around the opening, or the length of one side of the opening increases along with the increase in size of the display panel, the vicinity of the peripheral edge of the opening of the exterior case becomes easily bendable. Therefore, even if the dimensional accuracy and assembly accuracy of related components are controlled with a high degree of accuracy, the vicinity of the peripheral edge of the opening is pressed backward and comes into contact with the vibrating touch panel when the user presses their fingertip against the peripheral region of the touch panel, and vibration noise is generated during the input operation. In particular, when this type of touch screen device is applied to an on-board electronic device, the user often performs an input operation using the lower edge of the opening as a finger guide without looking at the panel surface, and therefore, the above-described problem of generation of vibrating noise at the time of input operation becomes pronounced.

SUMMARY OF THE INVENTION

The present invention has been made in view of such a problem of the conventional art. It is an object of the present invention to provide a touch screen device in which vibration noise is not generated even if the exterior case is partly pressed at the time of input operation.

In one aspect, a touch screen device includes a display panel, a touch panel disposed in front of and opposite to the display panel with a first space therebetween, a vibrating element that vibrates the touch panel in a direction perpendicular to a panel surface of the touch panel, and an exterior case provided with a rectangular opening that exposes the touch panel. The peripheral edge of the opening faces the panel surface of the touch panel with a second space therebetween. An elastic body facing the panel surface of the touch panel with a third space narrower than the second space therebetween is provided on the back surface of the exterior case. When the peripheral edge of the opening is pressed backward and bent, the elastic body is pressed against the panel surface of the touch panel and presses the touch panel into the first space, and the peripheral edge of the opening and the panel surface of the touch panel are thereby maintained out of contact with each other.

In the touch screen device configured as above, the peripheral edge of the opening of the exterior case faces the panel surface of the touch panel with the second space therebetween, and the elastic body faces the panel surface of the touch panel with the third space narrower than the second space therebetween. Therefore, the back surface of the exterior case does not come into contact with the panel surface of the touch panel when the touch screen device is not operated. When the user presses their fingertip against the panel surface of the touch panel and thereby performs input operation, the vibrating element is activated and vibrates the touch panel in the thickness direction. Therefore, the user can learn from the vibration transmitted to the fingertip that input operation is being surely performed or that the user is touching a wrong location. When, at the time of such input operation, the peripheral edge of the opening is pressed toward the touch panel by the finger of the user, the elastic body is pressed against the panel surface and displaces the touch panel backward, and therefore the third space becomes zero, whereas the second space only becomes smaller than that when the touch screen device is not operated and does not become zero. Therefore, the back surface of the exterior case does not come into direct contact with the vibrating touch panel, and the generation of vibrating noise from the exterior case can be prevented while maintaining the feedback function by vibration.

It is preferable that the exterior case be provided with an easily deformable portion extending along the peripheral edge of the opening, and the elastic body be provided on the back surface of the easily deformable portion. In this case, although the elastic body may be provided on the whole of the back surface of the easily deformable portion, the elastic body may be provided at least in the center in the longitudinal direction of the easily deformable portion.

It is preferable that the exterior case be provided with a through-hole, and the easily deformable portion be provided in a region between the through-hole and the opening because operation buttons or the like can be disposed in the through-hole. If, in this case, a finger guide is formed on the front surface of the easily deformable portion, the user can grasp the position of the finger using the guide on the easily deformable portion, and therefore a touch screen device on which input operation can be easily performed without looking at the touch panel can be provided.

It is preferable that if the maximum amplitude of the vibration of the touch panel caused by the vibrating element is denoted as V, the dimension of the second space is denoted as G1, and the dimension of the third space is denoted as G2, V, G1, and G2 be set so as to satisfy the relationship of G1−G2>V.

If, in the above-described configuration, the display panel is provided with a cushion member that vibratably supports the touch panel, and the rigidity of the cushion member and the rigidity of the elastic body provided on the back surface of the exterior case are set to be substantially equal to each other, the touch panel that vibrates at the time of input operation is supported by the elastic body and the cushion member having substantially the same rigidity from the front and the back, and therefore it is possible to stably hold the touch panel without interfering with the vibration thereof. When, at the time of input operation, the peripheral edge of the opening of the exterior case is pressed and the elastic body comes into contact with the panel surface and displaces the touch panel backward, there is not significant difference in the amount of compressive change between the elastic body and the cushion member. Therefore, there is no need to set the gap length of one of the first space and the second space to be large in advance, and the increase in size of the whole device can be suppressed.

DETAILED DESCRIPTION OF THE DRAWINGS

As shown in FIG. 1 to FIG. 5, one implementation of a touch screen device 1 may includes an exterior case 2 installed in an instrument panel or the like in a vehicle interior, a display panel 3 held on the back surface of the exterior case 2, and a touch panel 4 supported on the front surface of the display panel 3. A disk player (not shown) is disposed behind the exterior case 2.

Figure 1:
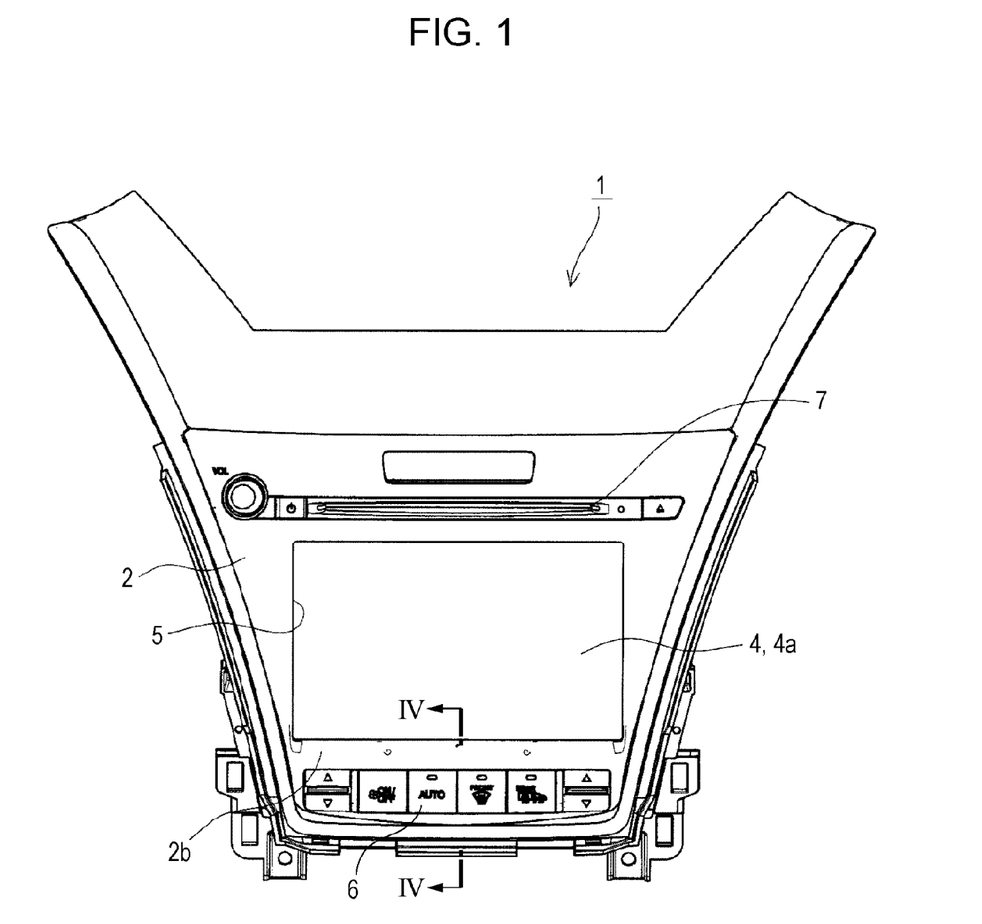
FIG. 1 is a front view of one implementation of a touch screen device.
Figure 2:
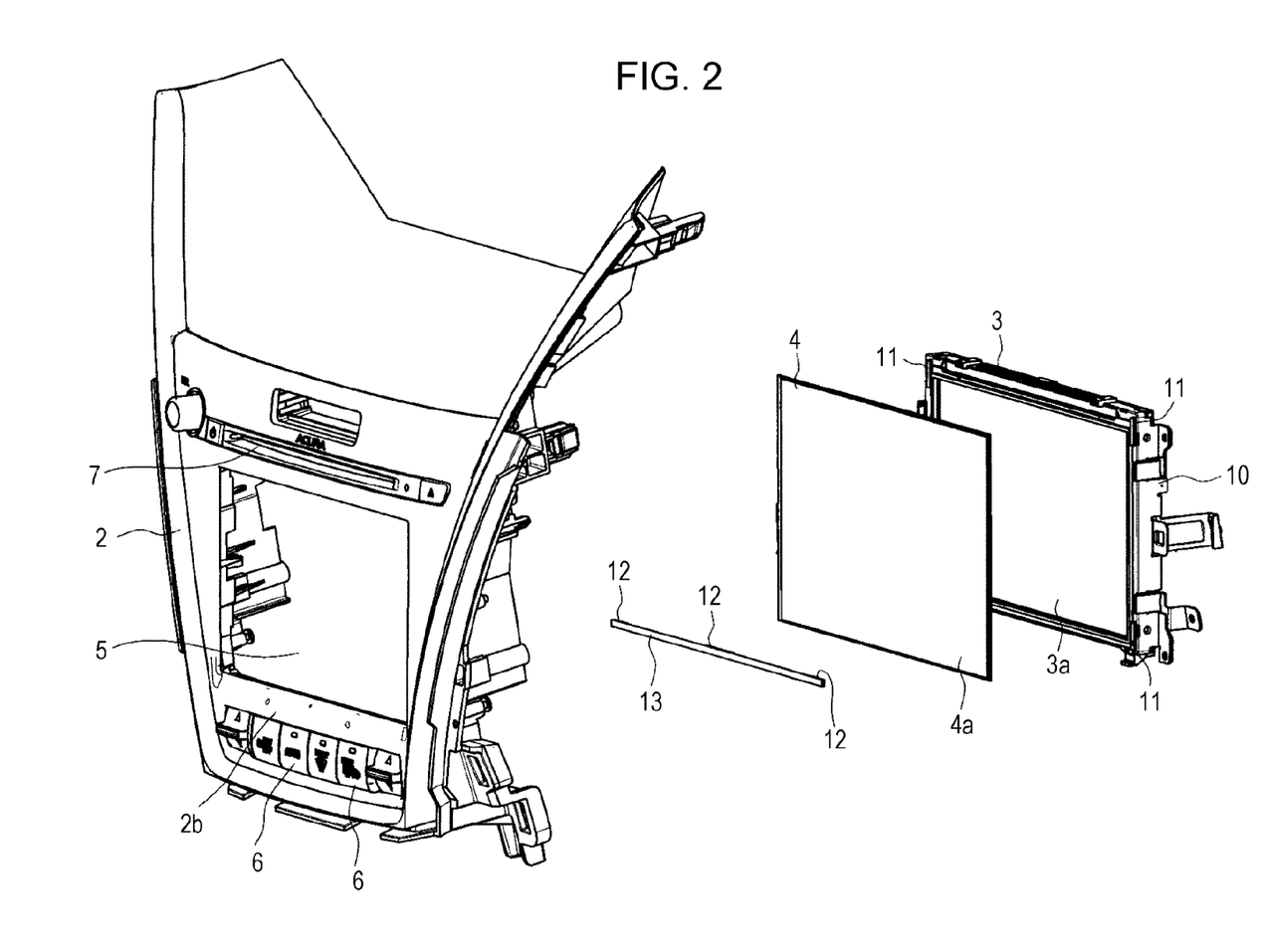
FIG. 2 is an exploded perspective view of the touch screen device as seen from the front.
Figure 3:
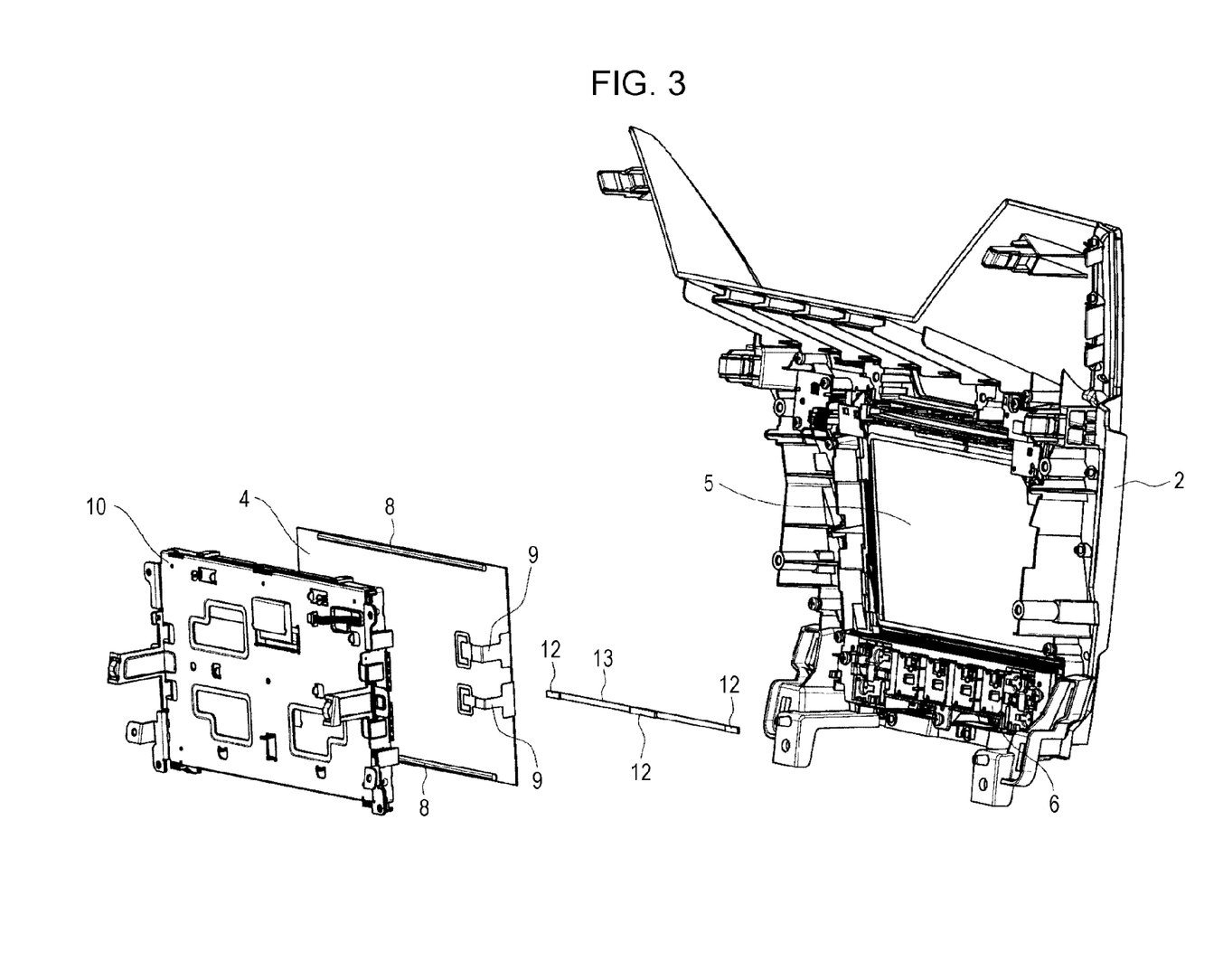
FIG. 3 is an exploded perspective view of the touch screen device as seen from the back.
Figure 4:
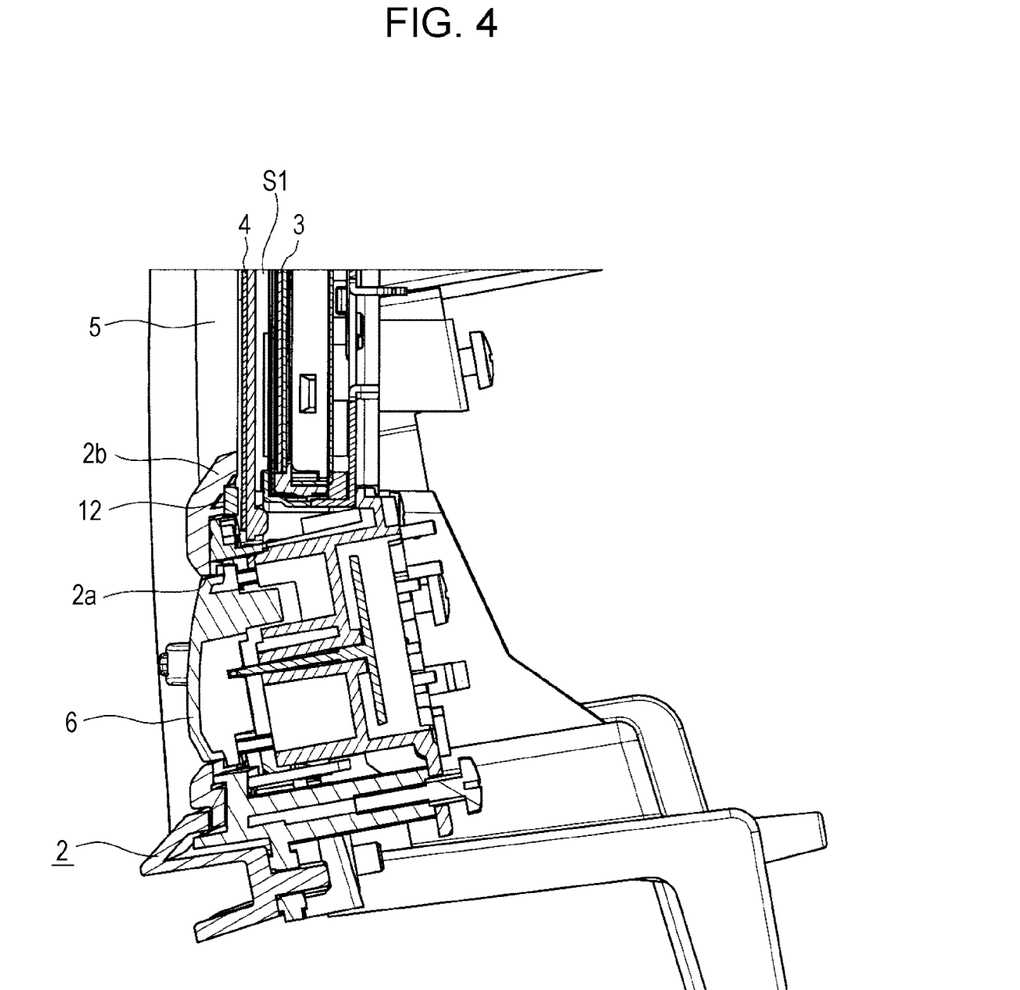
FIG. 4 is an enlarged sectional view taken along line IV-IV of FIG. 1.

The exterior case 2 may be molded of synthetic resin, and have a rectangular opening 5 formed in the center thereof. In the lower region of the exterior case 2, a plurality of operation buttons 6 are arranged along the horizontal direction. The operation buttons 6 are pushably housed in a through-hole 2a formed in the exterior case 2 (see FIG. 4). Therefore, a horizontally long beam-like part is formed between the through-hole 2a of the exterior case 2 and the lower edge of the opening 5, and this part is an easily deformable portion 2b that is easily bendable. Recess and protrusion shapes or small protrusion shapes are formed on the outer surface of the easily deformable portion 2b so that the user can grasp the position of their finger using these shapes as finger guides. The recess and protrusion shapes or small protrusion shapes are formed at locations corresponding in the vertical direction to images such as a menu displayed on the lower region of a display surface 3a of the display panel 3 to be described later. A horizontally long disk insertion slot 7 is provided in the upper region of the exterior case 2. A disk is inserted into and ejected from the above-described disk player through the disk insertion slot 7. Although the part between the disk insertion slot 7 of the exterior case 2 and the upper edge of the opening 5 is also easily bendable, finger guides are not formed on this part.

The display panel 3 is a display device such as an LCD or organic EL display, and the display panel 3 has a rectangular display surface 3a that is slightly larger than the opening 5 of the exterior case 2. The touch panel 4 has a panel surface (input operation surface) 4a that is about the same size as the display surface 3a of the display panel 3. Vibrating elements 8 are fixed to the back surface of the touch panel 4 along the upper and lower edges. The vibrating elements 8 are plate-like piezoelectric actuators or the like. When a drive signal is applied to an FPC 9 connected to the touch panel 4, the vibrating elements 8 expand and contract, and thereby vibrate the touch panel 4 in the thickness direction. The touch panel 4 is a coordinate input device that can detect the coordinate position (x-coordinate and y-coordinate) of a fingertip or the like of the user pressed against the panel surface 4a. Any method, such as a resistance film method or an electrostatic capacitance method, can be selected as a method of detection.

The display panel 3 is surrounded by a frame 10, the front of which is open. The display panel 3, the touch panel 4, and the frame 10 are integrated and form a display unit. Cushion members 11 are fixed to the four corners of the front surface of the frame 10 using double-sided tape or adhesive. The cushion members 11 are made of a relatively rigid elastic material such as polyurethane foam. The cushion members 11 have a predetermined thickness, and the front surfaces of the cushion members 11 are located in front of the display surface 3a of the display panel 3. The four corners of the back surface of the touch panel 4 are adhesively fixed to the cushion members 11. The touch panel 4 is thereby elastically supported on the cushion members 11 provided on the four corners of the display panel 3, and a first space S1 is secured between the display panel 3 and the touch panel 4 (see FIG. 4 and FIG. 5).

Figure 5:
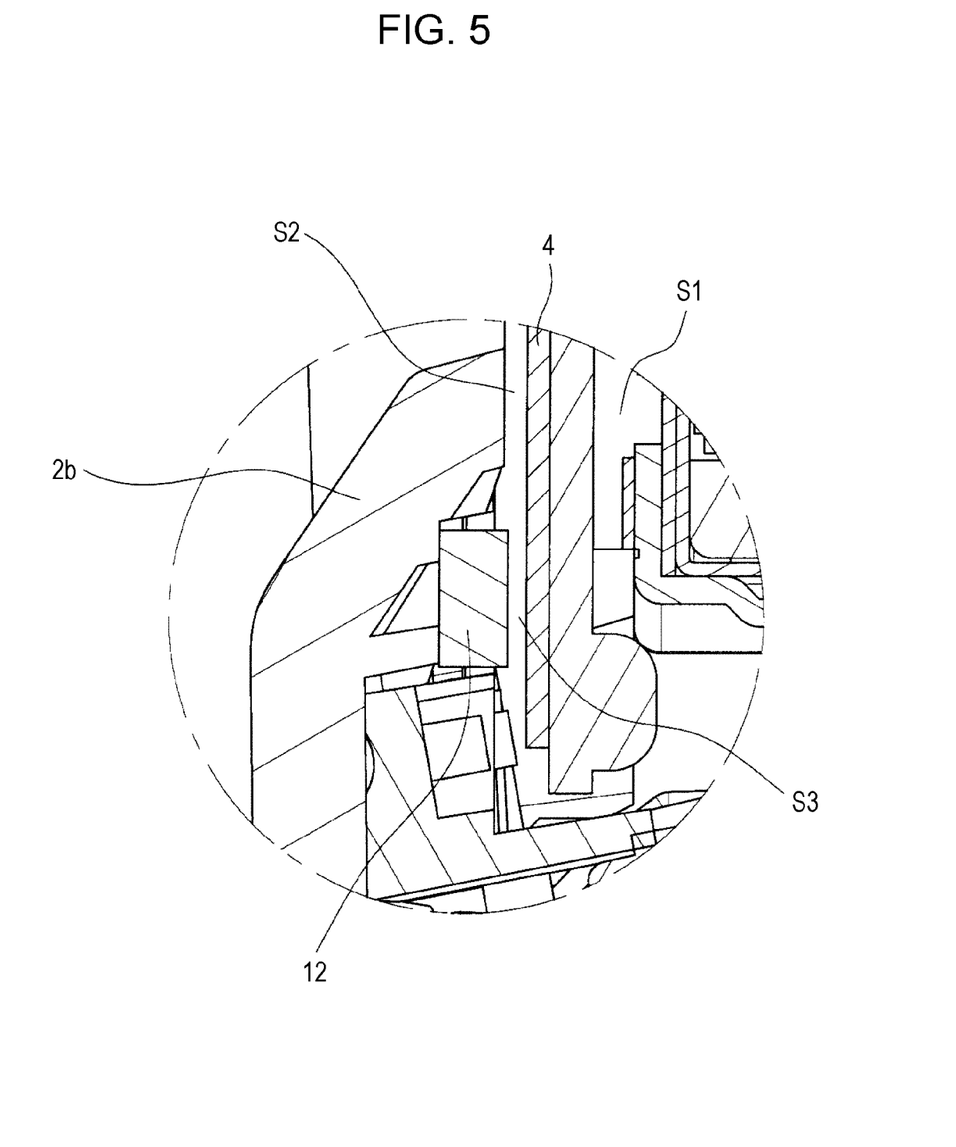
FIG. 5 is a detailed view of the main part of FIG. 4.

The frame 10 is fixed to the back surface of the exterior case 2 with screws or the like. The panel surface 4a of the touch panel 4 integrated with the frame 10 is exposed in the opening 5 of the exterior case 2, and the user can thereby see an image displayed on the display surface 3a of the display panel 3 through the transparent touch panel 4. As shown in FIG. 5, in such a state where the display unit is attached, a second space S2 is secured between all the edges of the opening 5 provided in the exterior case 2 and the panel surface 4a of the touch panel 4 so that the peripheral edge of the opening 5 does not come into contact with the touch panel 4. Elastic bodies 12 are provided on the back surface of the easily deformable portion 2b extending along the lower edge of the opening 5. A third space S3 is secured between the elastic bodies 12 and the panel surface 4a of the touch panel 4. If the gap length of the second space S2 is denoted as G1, and the gap length of the third space S3 is denoted as G2, the gap length G2 of the third space S3 is set to a value less than the gap length G1 of the second space S2. In the case of this embodiment, the gap length G1 of the second space S2 is 0.5 mm, and the gap length G2 of the third space S3 is 0.3 mm.

The elastic bodies 12 are provided at three locations: the center and both ends in the longitudinal direction (horizontal direction in FIG. 1) of the back surface of the easily deformable portion 2b. In order to easily attach the elastic bodies 12 to predetermined locations on the easily deformable portion 2b, the elastic bodies 12 are integrated with an auxiliary sheet 13 such as a synthetic resin sheet by adhesive bonding or the like when attached to the back surface of the easily deformable portion 2b. The elastic bodies 12 are made of a relatively rigid elastic material such as polyurethane foam. The rigidity of the elastic bodies 12 is substantially equal to or slightly greater than that of the cushion members 11.

In the case of the touch screen device having such a configuration, when the user presses their fingertip or the like against the panel surface 4a of the touch panel 4 exposed in the opening 5 of the exterior case 2, the touch panel 4 detects the coordinate position of the fingertip or the like, and the display image on the display panel 3, various other functions, or a mechanism such as the above-described disk player is controlled on the basis of the detection result of the touch panel 4. In the touch screen device 1, when a fingertip or the like of the user is pressed against the panel surface 4a, the vibrating elements 8 are activated and vibrate the touch panel 4 in the thickness direction. Therefore, the user can learn from the vibration transmitted to the fingertip or the like that an input operation is being surely performed or that the user is touching a wrong location.

Figure 6:
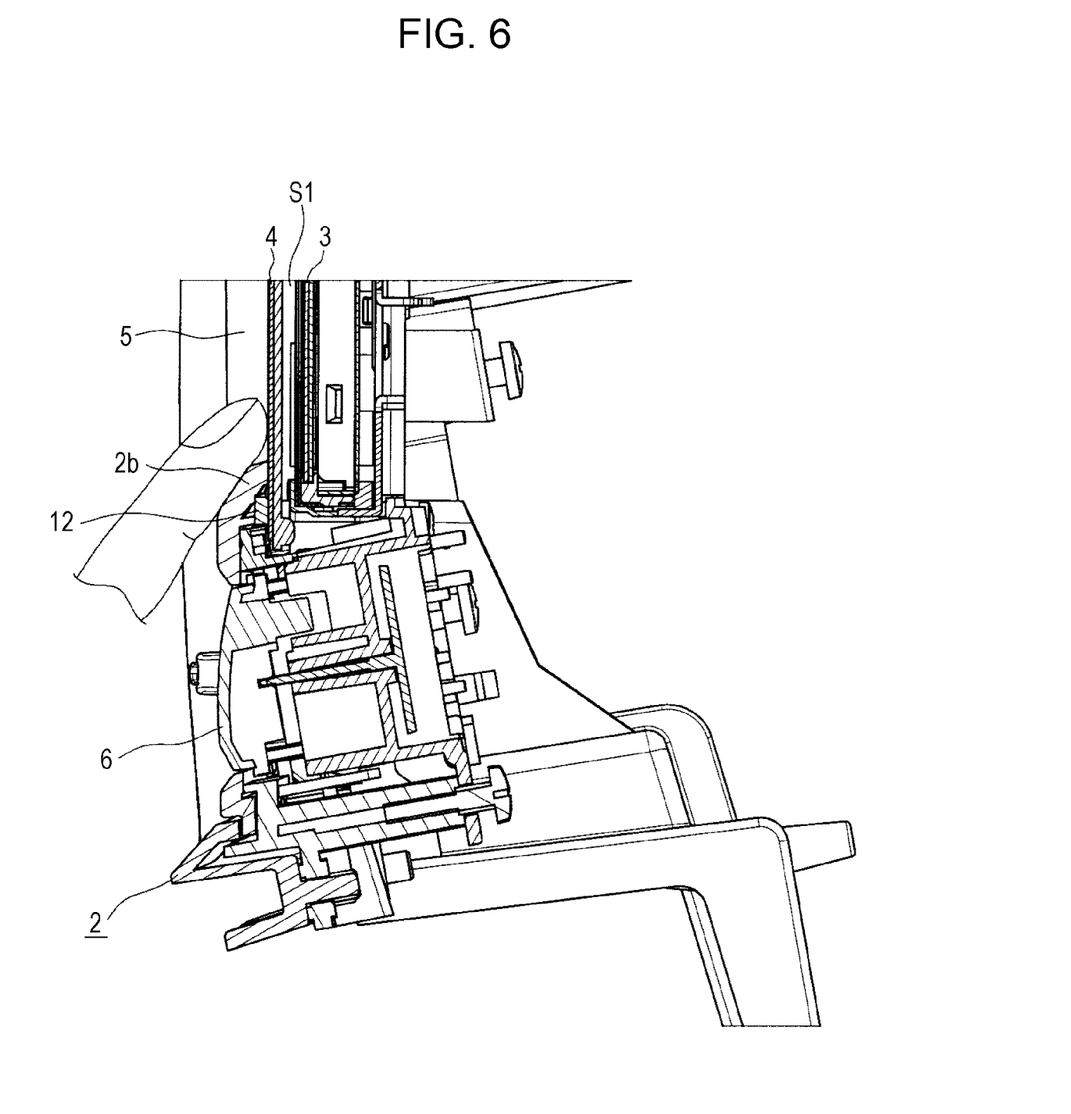
FIG. 6 is an explanatory view showing a state where input operation is being performed on the touch screen device.

The user often performs an input operation using the easily deformable portion 2b as a finger guide without looking at the panel surface 4a. In particular, when selecting from images such as a menu displayed on the lower region of the display surface 3a of the display panel 3, the user performs input operation on the touch panel 4 using the recess and protrusion shapes formed on the outer surface of the easily deformable portion 2b as guides while pressing their fingertip against the easily deformable portion 2b. Therefore, as shown in FIG. 6, the easily deformable portion 2b is pressed backward (toward the panel surface 4a) by the finger of the user.

Figure 7:
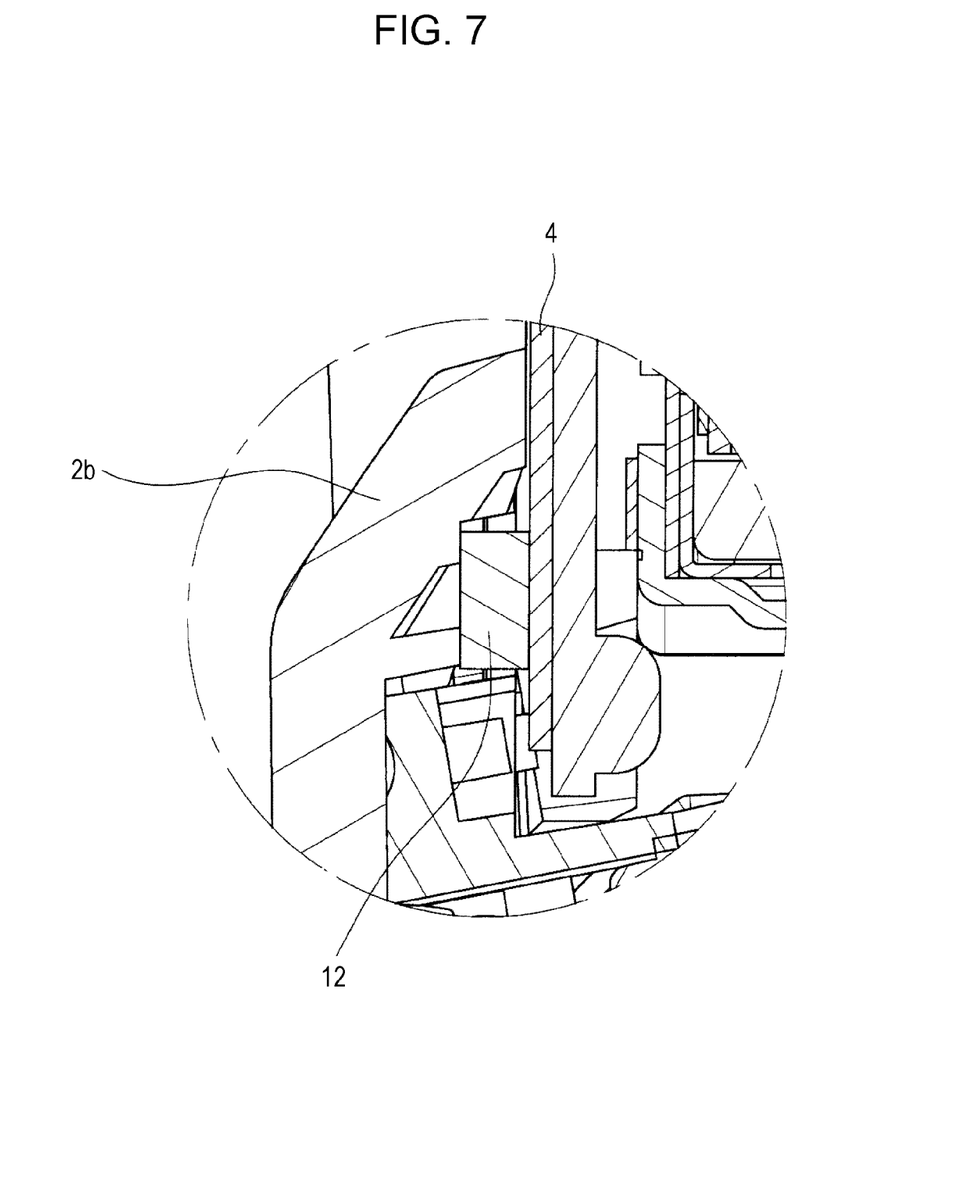
FIG. 7 is a detailed view of the main part of FIG. 6.

As a result, the easily deformable portion 2b bends, and the elastic bodies 12 provided on the back surface of the easily deformable portion 2b come into contact with the panel surface 4a. When the easily deformable portion 2b is further pressed backward, the elastic bodies 12 made of a relatively rigid elastic material displace the touch panel 4 backward (toward the first space S1) while being slightly compressively deformed. At this time, as shown in FIG. 7, the third space S3 secured between the elastic bodies 12 and the panel surface 4a becomes zero, and the second space S2 secured between the peripheral edge of the opening 5 and the panel surface 4a decreases. However, since the gap length G2 of the third space S3 is set to be less than the gap length G1 of the second space S2 in advance, and the rigidity of the elastic bodies 12 is substantially equal to or greater than that of the cushion members 11 on the back surface of the touch panel 4, the third space S3 becomes zero (G2=0), whereas the second space S2 only becomes smaller than that when the touch screen device is not operated (G1−G2<0.2 mm) and does not become zero. Therefore, the peripheral edge of the opening 5 does not come into direct contact with the panel surface 4a of the vibrating touch panel 4, and the generation of vibrating noise from the exterior case 2 can be prevented.

Although the vibration of the touch panel 4 is slightly attenuated by the contact of the elastic bodies 12 with the panel surface 4a, the feedback function by vibration to the user is maintained because the elastic bodies 12 are made of a material having a moderate elasticity such as polyurethane foam and do not come into contact with the whole of the panel surface 4a (come into contact at three locations on the lower edge of the opening 5 in this embodiment). Let the maximum amplitude of the touch panel 4 be denoted as V. If the maximum amplitude V and the gap lengths G1 and G2 of the second and third spaces S2 and S3 are set so as to satisfy the relationship of G1−G2>V, the contact of the peripheral edge of the opening 5 with the vibrating panel surface 4a can be surely avoided even when the elastic bodies 12 are pressed against the panel surface 4a by pressing the easily deformable portion 2b.

As described above, in some implementations of the touch screen device 1, the peripheral edge of the opening 5 of the exterior case 2 faces the panel surface 4a of the touch panel 4 with a second space S2 therebetween, elastic bodies 12 are provided on the back surface of an easily deformable portion 2b extending along the peripheral edge of the opening 5, and the elastic bodies 12 face the panel surface 4a of the touch panel 4 with a third space S3 narrower than the second space S2 therebetween. When the user presses their fingertip against the panel surface 4a of the touch panel 4 exposed in the opening 5 and thereby performs input operation, the vibrating elements 8 are activated and vibrate the touch panel 4 in the thickness direction. Therefore, the user can learn from the vibration transmitted to the fingertip that input operation is being surely performed. When, at the time of such input operation, the easily deformable portion 2b on the peripheral edge of the opening 5 is pressed toward the touch panel 4 by the finger of the user, the elastic bodies 12 are pressed against the panel surface 4a and displace the touch panel 4 backward, and therefore the gap length G2 of the third space S3 becomes zero, whereas the gap length G1 of the second space S2 only becomes smaller than that when the touch screen device is not operated and does not become zero. Therefore, the peripheral edge of the opening 5 does not come into direct contact with the vibrating touch panel 4, and vibrating noise is not generated from the exterior case. Although the vibration of the touch panel 4 is slightly attenuated by the contact of the elastic bodies 12 with the panel surface 4a, the feedback function by vibration is maintained because the elastic bodies 12 are elastic.

In some implementations of the touch screen device 1, a through-hole 2a for disposing operation buttons 6 is provided in the exterior case 2, and the region between the through-hole 2a and the lower edge of the opening 5 is an easily deformable portion 2b serving as a finger guide. Therefore, the user can perform input operation on the touch panel 4 without looking at the touch panel 4, while grasping the position of the finger using the easily deformable portion 2b as a guide. Elastic bodies 12 are provided on the back surface of such an easily deformable portion 2b. Therefore, even if the easily deformable portion 2b is pressed backward (toward the panel surface 4a) by the finger of the user when the user performs input operation while pressing their finger against the easily deformable portion 2b, the peripheral edge of the opening 5 can be prevented from coming into contact with the vibrating touch panel 4.

In these implementations of touch screen devices 1, cushion members 11 that vibratably support the touch panel 4 are provided on the four corners of the display panel 3, and the rigidity of the cushion members 11 and the rigidity of the elastic bodies 12 are set to be substantially equal to each other. Therefore, the touch panel 4 that vibrates at the time of input operation is supported by the cushion members 11 and the elastic bodies 12 having substantially the same rigidity from the front and the back, and it is possible to stably hold the touch panel 4 without interfering with the vibration thereof. When, at the time of input operation, the peripheral edge of the opening 5 is pressed and the elastic bodies 12 come into contact with the panel surface 4a and displaces the touch panel 4 backward, there is not significant difference in the amount of compressive change between the elastic bodies 12 and the cushion members 11. Therefore, there is no need to set the gap length of one of the first space S1 and the second space S2 to be large in advance, and the increase in size of the whole device can be suppressed.

In the above-described implementations, a description has been given of a case where a through-hole 2a for disposing operation buttons 6 is provided in the exterior case 2, and the part between the through-hole 2a and the lower edge of the opening 5 is an easily deformable portion 2b. However, the through-hole may be a through-hole for disposing members other than the operation buttons 6, or a through-hole for aesthetic purpose only.

In the above-described implementations, a description has been given of a case where elastic bodies 12 are provided at three locations: the center and both ends in the longitudinal direction of the back surface of the easily deformable portion 2b. However, in other implementations, an elastic body 12 may be provided in the center in the longitudinal direction of the easily deformable portion 2b, which is most easily bent, or an elastic body 12 may be provided on the whole (including the center) of the back surface of the easily deformable portion 2b. Elastic bodies 12 may be provided at locations other than the locations shown in the above-described embodiment, for example, on the part between the disk insertion slot 7 of the exterior case 2 and the upper edge of the opening 5, and on the left and right edges of the opening 5.

In the above-described implementations, a description has been given of a case where the touch screen device 1 of the present invention is applied to an on-board electronic device. However, the touch screen device 1 of the present invention can also be applied to other consumer devices and industrial devices.

It is intended that the foregoing detailed description be regarded as illustrative rather than limiting, and that it be understood that it is the following claims, including all equivalents, that are intended to define the spirit and scope of this invention.

What is claimed is:

1. A touch screen device comprising:
a display panel;
a touch panel disposed in front of and opposite to the display panel with a first space therebetween;
a vibrating element that vibrates the touch panel in a direction perpendicular to a panel surface of the touch panel; and
an exterior case provided with a rectangular opening that exposes the touch panel, a portion of the exterior case extending along the peripheral edge of the opening facing the panel surface of the touch panel with a second space therebetween,
wherein an elastic body facing the panel surface of the touch panel with a third space narrower than the second space therebetween is provided on the back surface of the exterior case, and
wherein when the portion of the exterior case is pressed backward and bent, the elastic body is pressed against the panel surface of the touch panel and presses the touch panel into the first space, and the portion of the exterior case and the panel surface of the touch panel are thereby maintained out of contact with each other.

2. The touch screen device according to claim 1, wherein the exterior case is provided with an easily deformable portion extending along the peripheral edge of the opening, and the elastic body is provided on the back surface of the easily deformable portion.

3. The touch screen device according to claim 2, wherein the elastic body is provided at least in the center in the longitudinal direction of the easily deformable portion.

4. The touch screen device according to claim 2, wherein the exterior case is provided with a through-hole, and the easily deformable portion is provided in a region between the through-hole and the opening.

5. The touch screen device according to claim 2, wherein a finger guide is formed on the front surface of the easily deformable portion.

6. The touch screen device according to claim 1, wherein if the maximum amplitude of the vibration of the touch panel caused by the vibrating element is denoted as V, the dimension of the second space is denoted as G1, and the dimension of the third space is denoted as G2, V, G1, and G2 are set so as to satisfy the relationship of $G1-G2>V$.

7. The touch screen device according to claim 1, wherein the display panel is provided with a cushion member that vibratably supports the touch panel.

8. The touch screen device according to claim 7, wherein the rigidity of the cushion member and the rigidity of the elastic body are set to be substantially equal to each other.

9. A touch screen device comprising:
a display panel;
a touch panel disposed in front of and opposite to the display panel with a first space therebetween;
a vibrating element that vibrates the touch panel in a direction perpendicular to a panel surface of the touch panel; and
an exterior case provided with a rectangular opening that exposes the touch panel, a portion of the exterior case extending along the peripheral edge of the opening facing the panel surface of the touch panel with a second space therebetween,
wherein the display panel is provided with a cushion member that vibratably supports the touch panel,
wherein an elastic body facing the panel surface of the touch panel with a third space narrower than the second space therebetween is provided on the back surface of the exterior case, and
wherein when the portion of the exterior case is pressed backward and bent, the elastic body is pressed against the panel surface of the touch panel and presses the touch panel into the first space, and the portion of the exterior case and the panel surface of the touch panel are thereby maintained out of contact with each other.

10. The touch screen device according to claim 9, wherein the rigidity of the cushion member and the rigidity of the elastic body are set to be substantially equal to each other.

11. The touch screen device according to claim 9, wherein the exterior case is provided with an easily deformable portion extending along the peripheral edge of the opening, and the elastic body is provided on the back surface of the easily deformable portion.

12. The touch screen device according to claim 11, wherein the elastic body is provided at least in the center in the longitudinal direction of the easily deformable portion.

13. The touch screen device according to claim 11, wherein the exterior case is provided with a through-hole, and the easily deformable portion is provided in a region between the through-hole and the opening.

14. The touch screen device according to claim 11, wherein a finger guide is formed on the front surface of the easily deformable portion.

15. The touch screen device according to claim 9, wherein if the maximum amplitude of the vibration of the touch panel caused by the vibrating element is denoted as V, the dimension of the second space is denoted as G1, and the dimension of the third space is denoted as G2, V, G1, and G2 are set so as to satisfy the relationship of G1−G2>V.

* * * * *